United States Patent
Kubo

(10) Patent No.: US 10,305,526 B2
(45) Date of Patent: May 28, 2019

(54) WIRELESS RECEPTION DEVICE AND WIRELESS RECEPTION METHOD

(71) Applicant: NEC Corporation, Minato-ku, Tokyo (JP)

(72) Inventor: Shota Kubo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/867,949

(22) Filed: Jan. 11, 2018

(65) Prior Publication Data

US 2018/0219568 A1 Aug. 2, 2018

(30) Foreign Application Priority Data

Feb. 1, 2017 (JP) .................................. 2017-016628

(51) Int. Cl.
*H04B 1/10* (2006.01)

(52) U.S. Cl.
CPC .................................. *H04B 1/1081* (2013.01)

(58) Field of Classification Search
CPC .... H04B 1/1081; H04B 1/1027; H04B 1/123; H04B 1/1036
See application file for complete search history.

(56) References Cited

U.S. PATENT DOCUMENTS

| | | | | |
|---|---|---|---|---|
| 2002/0064217 A1* | 5/2002 | Ohsuge | ................ | H04B 1/7113 375/152 |
| 2002/0094018 A1* | 7/2002 | Terao | ................... | H04B 1/7113 375/147 |
| 2005/0147064 A1* | 7/2005 | Nakagawa | ............... | H01Q 3/26 370/335 |
| 2007/0036231 A1* | 2/2007 | Ido | ..................... | H04L 25/0222 375/260 |
| 2009/0046588 A1* | 2/2009 | Matsumoto | .......... | H04B 1/7113 370/241 |
| 2009/0221254 A1* | 9/2009 | Kawauchi | ............ | H04B 1/1036 455/296 |

FOREIGN PATENT DOCUMENTS

| | | |
|---|---|---|
| JP | 2010-246024 A | 10/2010 |
| JP | 2011-217424 A | 10/2011 |

* cited by examiner

*Primary Examiner* — Syed Haider

(57) ABSTRACT

In order to improve accuracy in estimating a transmission line that includes a delay path having a long delay time, the present invention provides a wireless reception device that includes a transmission estimation unit including: a delay profile generation unit that estimates a transmission line from a reference signal portion by using a known reference signal replica, and that calculates a delay profile from a transmission line estimation result; a path detection unit that detects a position of a sample, which is included in the delay profile, as a path position; a delay profile division unit that divides the delay profile based on the path position; and a transmission line calculation unit that calculates a transmission line per path by carrying out averaging to the delay profile per path in the frequency domain, and that combines transmission line calculation results per path.

10 Claims, 15 Drawing Sheets

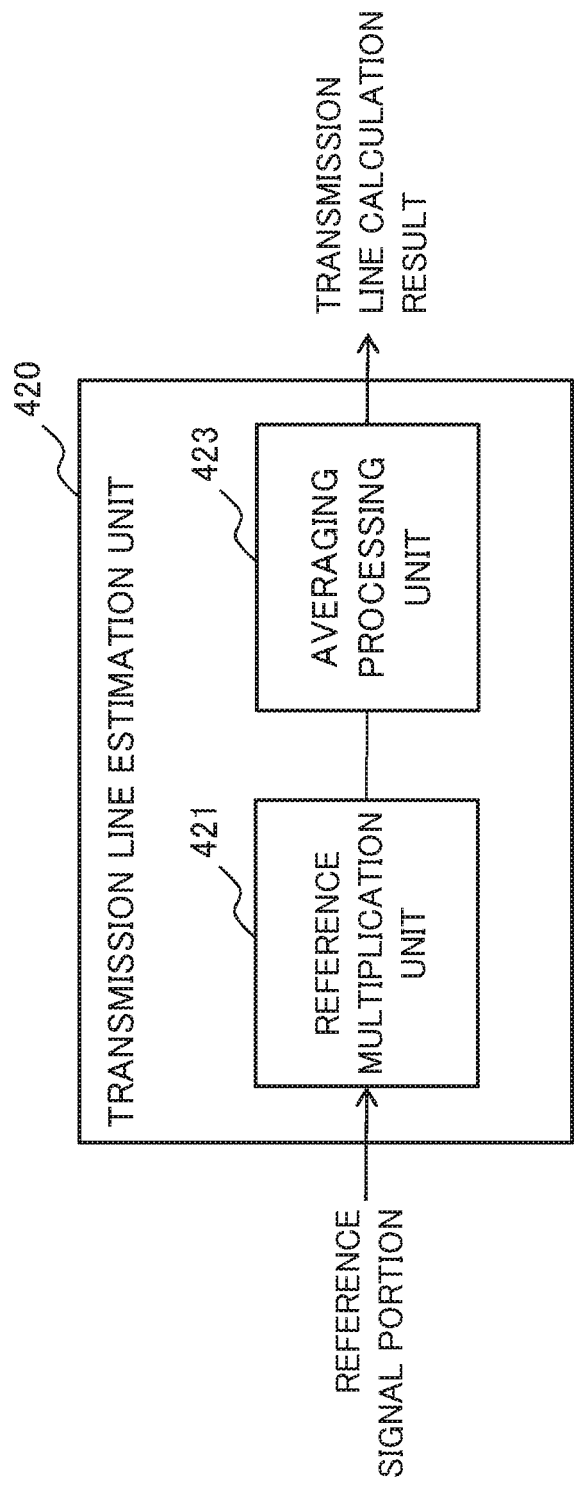

WIRELESS RECEPTION DEVICE AND WIRELESS RECEPTION METHOD

This application is based upon and claims the benefit of priority from Japanese Patent Application No. 2017-016628, filed on Feb. 1, 2017, the disclosure of which is incorporated herein in its entirety by reference.

TECHNICAL FIELD

The present invention relates to a wireless reception device and a wireless reception method.

BACKGROUND ART

In the case of wireless communication, a reception signal is caused distortion due to influence of reflection, diffraction, dispersion or the like which is caused by an obstacle such as a building or the like. Therefore, a general reception device is requested to realize reliable reception performance by estimating a transmission line from the reception signal and correcting the distortion of the reception signal by using the estimation result.

The estimated transmission line includes influence of noise. As one of methods to suppress the noise, there is an art of carrying out averaging among adjacent samples in a frequency domain or a time domain. When carrying out averaging among the adjacent samples, each of desired signals that are held by the adjacent samples is in-phase each other, and consequently electric power of the desired signal does not decrease. On the other hand, a phase of the noise is random, and consequently electric power of the noise decreases in inverse proportion to number of the adjacent samples to which averaging is carried out. By using the above-mentioned characteristics, it is possible to decrease a ratio of the electric power of the noise to the electric power of the desired signal by increasing the number of the adjacent samples.

Here, when receiving a multi-path signal including a long delay time, a transmission line estimation result in the frequency domain includes influence of a phase fluctuation or an amplitude fluctuation among samples due to influence of a delay path. In the case of a general method of carrying out averaging to the transmission line in the frequency domain, when there is the phase fluctuation among the samples which are within an averaging range, averaging is carried out among the samples which lose the in-phase characteristics each other. Therefore, the general method of carrying out averaging to the transmission line in the frequency domain has a problem that an amplitude of the sample becomes small after carrying out averaging, and consequently accuracy in estimating the transmission line becomes degraded.

A patent literature 1 (hereinafter, denoted as PTL 1: Japanese Patent Application Laid-Open Publication No. 2010-246024) discloses an art to suppress the noise also in the case of a transmission line, which includes a path having a long delay time, by making paths, which are included in a delay profile, individually pass through infinite impulse response filters.

PTL 2 (Japanese Patent Application Laid-Open Publication No. 2011-217424) discloses an OFDM (Orthogonal Frequency Division Multiplexing) reception device which regenerate a data symbol by using a channel estimation value estimated from a pilot symbol. According to the device disclosed by PTL 2, since it is possible to carry out extrapolation in an effective out-of-band of the frequency domain in consideration of all path components in the time domain, it is possible to form a virtual waveform which sufficiently reflects various frequency components existing within an effective band.

According to the art disclosed by PTL 1, also when a delay time of an interference wave is long, it is possible to improve noise immunity. Here, in the case of the art disclosed by PTL 1, there is a possibility that, since a filter coefficient is selected out of a plurality of filter coefficients which are set in advance, and a filter having the selected filter coefficient is used, a path may exist at an edge of a pass-band of the filter. Therefore, the art disclosed by PTL 1 has a problem that, when the path exists at the edge of the pass-band of the filter, a side-robe of the path is removed, and consequently accuracy in estimating the transmission line becomes decreased.

According to the device disclosed by PTL 2, it is possible to find out the channel estimation value with accurately suppressing the noise also in the case of the transmission line which has large delay variance in the time domain. Here, according to the device disclosed by PTL 2, the noise is suppressed by replacing a complex amplitude value of an index in a band other than a path position of the delay profile with 0. Therefore, the device disclosed by PTL 2 has a problem that it is necessary to estimate the channel estimation value in the band other than the path position of the delay profile.

SUMMARY

An example object of the present invention is to provide a wireless reception device which suppresses the noise with maintaining the side robe, and can improve accuracy in estimating the transmission line which includes the path having the long delay time.

A wireless reception device according to an example aspect of the present invention includes a transmission line estimation unit including: a delay profile generation unit that inputs a reference signal portion which is included in a reception signal converted into a frequency domain signal, and that estimates a transmission line from the reference signal portion by using a known reference signal replica, and that calculates a delay profile from a transmission line estimation result; a path detection unit that inputs the delay profile from the delay profile generation unit, and that detects a position of a sample, which is included in the delay profile, as a path position; a delay profile division unit that inputs the delay profile from the delay profile generation unit, and inputs the path position from the path detection unit, and that divides the delay profile per a path on the basis of the path position; and a transmission line calculation unit that inputs the delay profiles per path into which the delay profile is divided by the delay profile division unit, and that calculates a transmission line per path by carrying out averaging to the delay profile per path in the frequency domain, and that combines transmission line calculation results per path.

A wireless reception method according to an example aspect of the present invention includes: estimating a transmission line from a reference signal portion, which is included in a reception signal converted into a frequency domain signal, by using a known reference signal replica; calculating a delay profile from a transmission line estimation result; detecting a position of a sample, which is included in the delay profile, as a path position; dividing the delay profile per a path based on the path position; calculating a transmission line per path by carrying out averaging to the delay profile per path in the frequency domain; and combining transmission line calculation results per path.

BRIEF DESCRIPTION OF THE DRAWINGS

Exemplary features and advantages of the present invention will become apparent from the following detailed description when taken with the accompanying drawings in which:

FIG. 15 is a block diagram illustrating a configuration of a transmission line estimation unit of a wireless reception device based on a related art.

EXAMPLE EMBODIMENT

Figure 1:
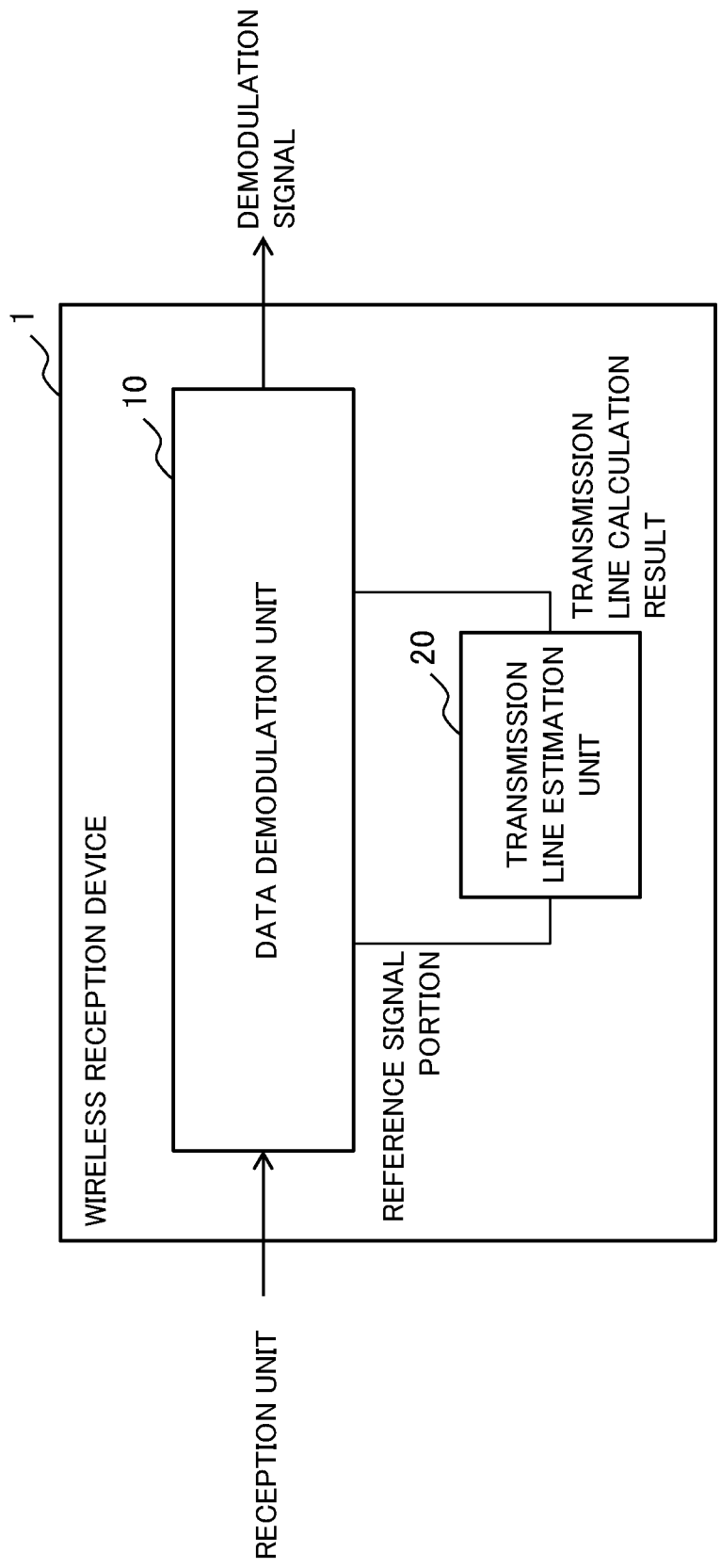
FIG. 1 is a block diagram illustrating a configuration of a wireless reception device according to a first example embodiment of the present invention.

Hereinafter, an example embodiment of the present invention will be explained with reference to drawings. While the example embodiment mentioned in the following has a technically preferred limitation in order to carry out the present invention, scope of the present invention is not limited to the following. Here, the same code is assigned to the same component in all of the drawings, which are used for explanation of the exemplary embodiment mentioned in the following, as far as there is no especial reason. Moreover, there is a case that, in the example embodiment mentioned in the following, repetitive explanation on the same configuration and operation may be omitted. Moreover, a direction of an arrow described in the drawing is merely exemplified, and the direction of the arrow does not limit a direction of a signal which flows between blocks.

(First Example Embodiment)

Firstly, a wireless reception device according to a first example embodiment of the present invention will be explained with reference to drawings. FIG. 1 is a block diagram illustrating a configuration of a wireless reception device 1 of the present example embodiment. As illustrated in FIG. 1, the wireless reception device 1 includes a data demodulation unit 10 and a transmission line estimation unit 20. At some places in the following, explanation will be provided on the assumption of signal transmission based on the orthogonal frequency division multiplexing (hereinafter, denoted as OFDM), but technique of the present example embodiment is applicable to technique other than OFDM.

The data demodulation unit 10 acquires a reception signal which is received by an antenna not illustrated in the drawing. The data demodulation unit 10 converts the acquired reception signal, which is a time domain signal, into a frequency domain signal. The data demodulation unit 10 divides the reception signal, which is converted into the frequency domain signal, into a reference signal portion and a data signal portion. The data demodulation unit 10 outputs the reference signal portion to the transmission line estimation unit 20.

The data demodulation unit 10 acquires a transmission line calculation result from the transmission line estimation unit 20. The data demodulation unit 10 demodulates the data signal portion to regenerate an original signal by using the acquired transmission line calculation result. The data demodulation unit 10 outputs demodulation signal (regenerated signal).

The transmission line estimation unit 20 inputs the reference signal portion out of the frequency domain signal which is outputted by the data demodulation unit 10. The transmission line estimation unit 20 estimates a transmission line from the inputted reference signal portion. The transmission line estimation unit 20 calculates a delay profile from a transmission line estimation result. The delay profile is graphed by using coordinate systems whose horizontal axis and vertical axis indicate time and reception electric-power respectively.

The transmission line estimation unit 20 detects a path from the calculated delay profile, and calculates a transmission line per path on the basis of delay profiles per path into which the delay profile is divided per the path. Then, the transmission line estimation unit 20 outputs the transmission line calculation result, which is acquired by combining all of transmission line calculation results per path, to the data demodulation unit 10.

[Transmission Line Estimation Unit]

Figure 2:
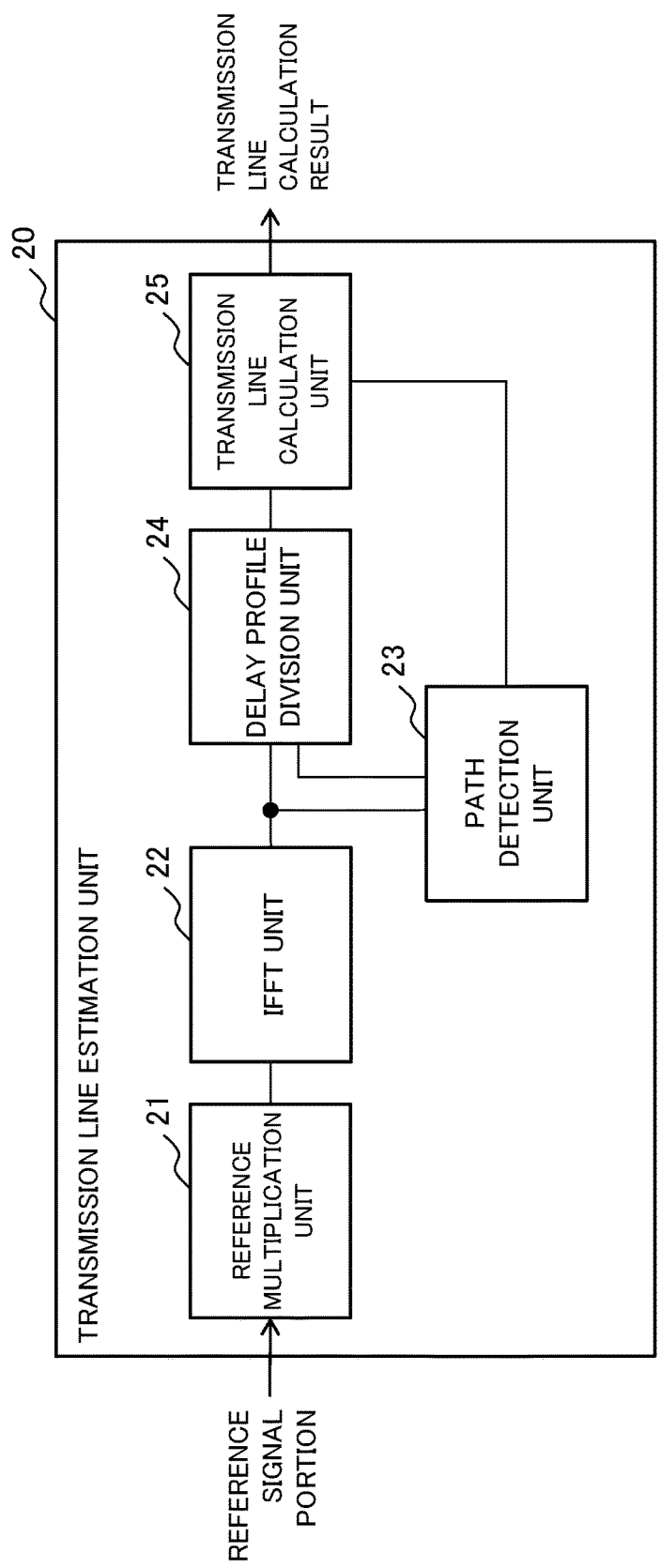
FIG. 2 is a block diagram illustrating a configuration of a transmission line estimation unit of the wireless reception device according to the first example embodiment of the present invention.

Next, a configuration of the transmission line estimation unit 20 will be explained with reference to drawings. FIG. 2 is a block diagram illustrating the configuration of the transmission line estimation unit 20. As illustrated in FIG. 2, the transmission line estimation unit 20 includes a reference multiplication unit 21, an IFFT unit 22, a path detection unit 23, a delay profile division unit 24, and a transmission line calculation unit 25 (IFFT: Inverse Fast Fourier Transform).

The reference multiplication unit 21 (also referred to as a multiplication unit) estimates the transmission line from the inputted reference signal portion by using a known reference signal replica. The reference multiplication unit 21 outputs the transmission line estimation result to the IFFT unit 22.

The IFFT unit 22 (also referred to as a delay profile calculation unit) inputs the transmission line estimation result from the reference multiplication unit 21. The IFFT unit 22 carries out Inverse Fourier Transform to the inputted transmission line estimation result, and calculates the delay profile. The IFFT unit 22 outputs the calculated delay profile to the delay profile division unit 24 and the path detection unit 23.

The path detection unit 23 inputs the delay profile from the IFFT unit 22. The path detection unit 23 detects a position of a sample, which is included in the inputted delay profile, as a path position. For example, the path detection unit 23 outputs a position of a sample, whose reception electric-power exceeds a prescribed threshold value, out of the inputted delay profile as the path position. The path detection unit 23 outputs the detected path position to the delay profile division unit 24.

The delay profile division unit 24 inputs the delay profile from the IFFT unit 22 and inputs the path position from the path detection unit 23. The delay profile division unit 24 divides the inputted delay profile into a plurality of delay profiles, whose number agrees with number of the paths, on the basis of the path position. The delay profile division unit 24 outputs delay profiles which are generated by division.

The transmission line calculation unit 25 inputs the delay profiles, which are generated by division, from the delay profile division unit 24. The transmission line calculation unit 25 removes phase rotation from the delay profile per path, and suppresses the electric power of the noise by carrying out an averaging process in the frequency domain to the delay profile per path from which the phase rotation is removed. After carrying out the averaging process in the frequency domain, the transmission line calculation unit 25 calculates the transmission line by multiplying an averaged transmission line estimation value per path by the phase rotation which has been removed before the averaging process, and combining transmission line calculation results per path on which the noise is suppressed. The transmission line calculation unit 25 outputs the transmission line calculation result which is acquired by adding all of the transmission line estimation results per path.

[Transmission Line Calculation Unit]

Figure 3:
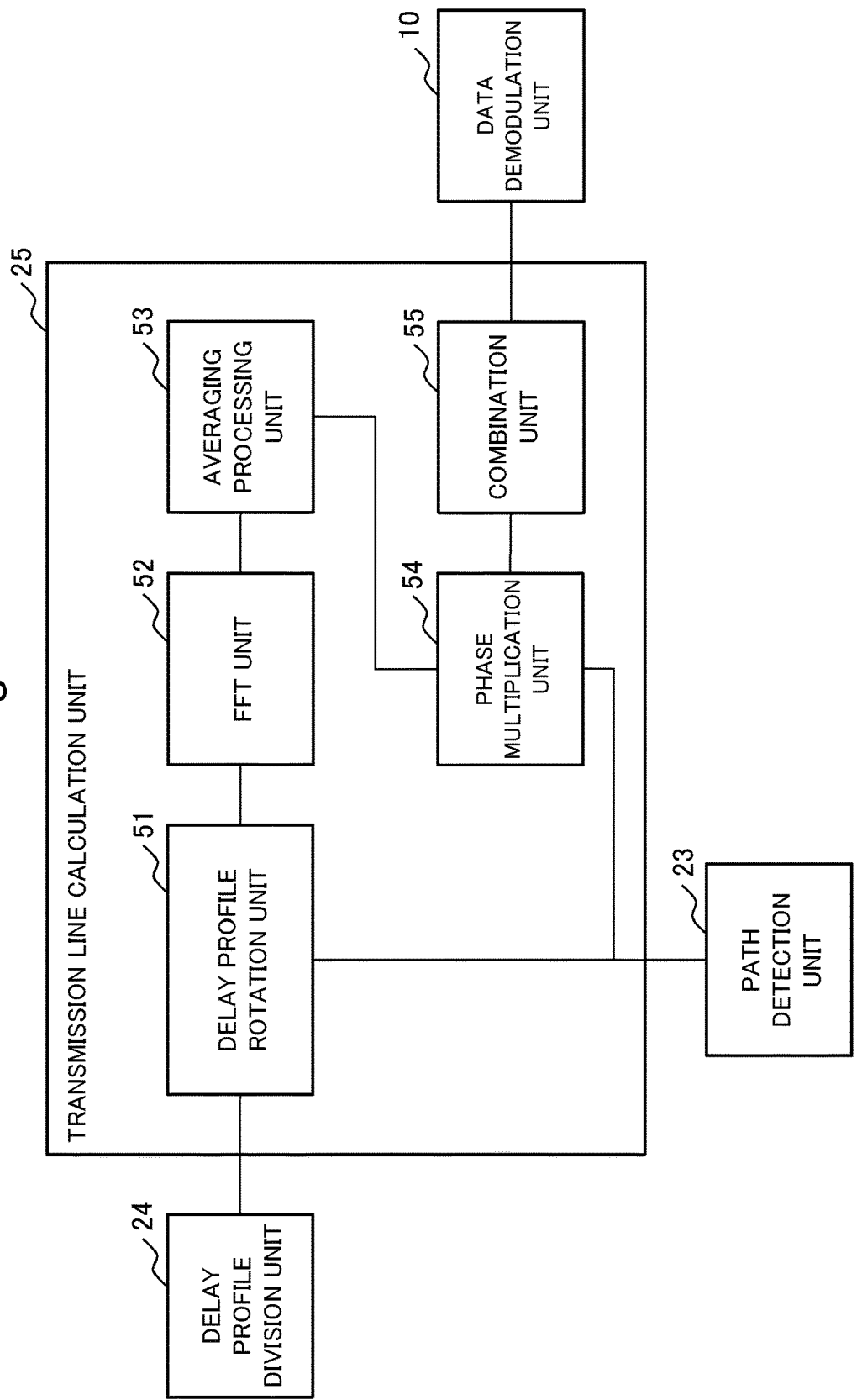
FIG. 3 is a block diagram illustrating a configuration of a transmission line calculation unit of the transmission line estimation unit of the wireless reception device according to the first example embodiment of the present invention.

FIG. 3 is a block diagram for illustrating a configuration of the transmission line calculation unit 25. Referring to FIG. 3, the transmission line calculation unit 25 includes a delay profile rotation unit 51, a FFT unit 52, an averaging processing unit 53, a phase multiplication unit 54, and a combination unit 55.

The delay profile rotation unit 51 inputs the delay profile from the delay profile division unit 24, and inputs the path position from the path detection unit 23. The delay profile rotation unit 51 removes the phase rotation by rotating each delay profile in such a way that path timing may become zero timing based on the path position which is inputted from the path detection unit 23. The delay profile rotation unit 51 outputs each delay profile (referred to as a rotated delay profile), from which the phase rotation is removed, to the FFT unit 52.

The FFT unit 52 (also referred to as a Fast Fourier Transform unit) inputs each rotated delay profile which is outputted by the delay profile rotation unit 51. The FFT unit 52 carries out FFT to each rotated delay profile which is inputted from the delay profile rotation unit 51. The FFT unit 52 outputs a FFT calculation result on each rotated delay profile (hereinafter, referred to as a transmission line estimation value per path) to the averaging processing unit 53.

The averaging processing unit 53 inputs the transmission line estimation value per path from the FFT unit 52. The averaging processing unit 53 carries out averaging to the transmission line estimation value per path, which is inputted from the FFT unit 52, in a unit of adjacent samples whose number is preset. The averaging processing unit 53 outputs the transmission line estimation value per path, to which averaging is carried out in the unit of the adjacent samples, to the phase multiplication unit 54.

The phase multiplication unit 54 inputs the path position from the path detection unit 23, and inputs the transmission line estimation value per path which is outputted by the averaging processing unit 53 and to which averaging is carried out in the unit of adjacent samples. The phase multiplication unit 54 calculates a transmission line calculation result per path by multiplying the averaged transmission line estimation value per path by a phase which cancels rotation carried out by the delay profile rotation unit 51 based on the path position which is inputted from the path detection unit 23. The phase multiplication unit 54 outputs the calculated transmission line calculation result per path to the combination unit 55.

The combination unit 55 inputs the transmission line calculation result per path from the phase multiplication unit 54. The combination unit 55 sums all of the transmission line calculation results per path which are inputted from the phase multiplication unit 54. The combination unit 55 outputs a total of the transmission line calculation results per path to the data demodulation unit 10 as the transmission line calculation result.

Figure 4:
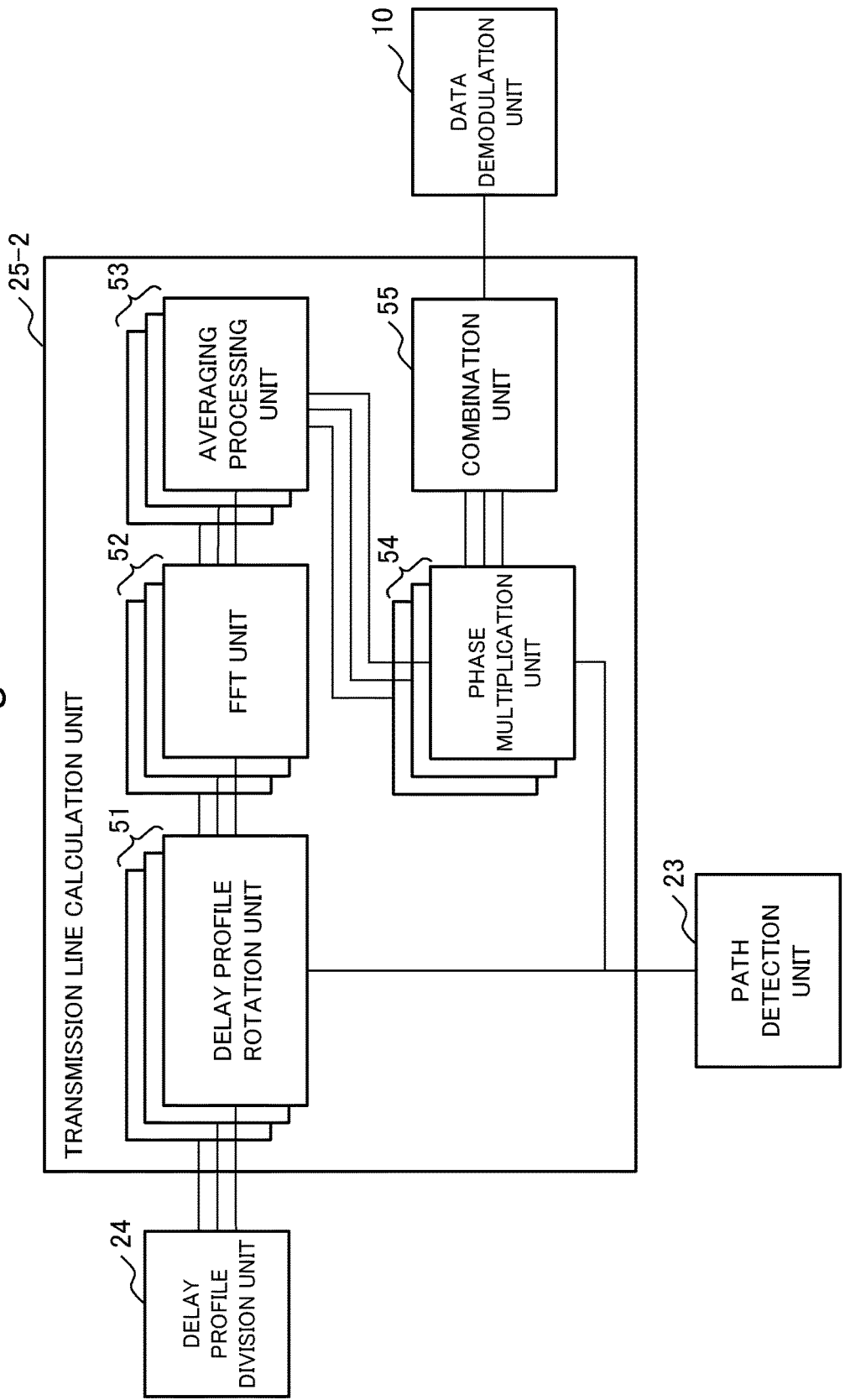
FIG. 4 is a block diagram illustrating a modification of the transmission line calculation unit of the transmission line estimation unit of the wireless reception device according to the first example embodiment of the present invention.

While the case that the delay profiles per path are processed sequentially is exemplified in FIG. 3, the delay profiles per path may be processed in parallel as illustrated in FIG. 4. A transmission line calculation unit 25-2 in FIG. 4 includes a plurality of the delay profile rotation units 51, the FFT units 52, the averaging processing units 53, and the phase multiplication units 54. The transmission line calculation unit 25-2 combines the transmission line calculation results per path, which are inputted from the phase multiplication units 54, by using the combination unit 55. The transmission line calculation unit 25-2 outputs a combination result to the data demodulation unit 10 as the transmission line calculation result.

[Data Demodulation Unit]

Figure 5:
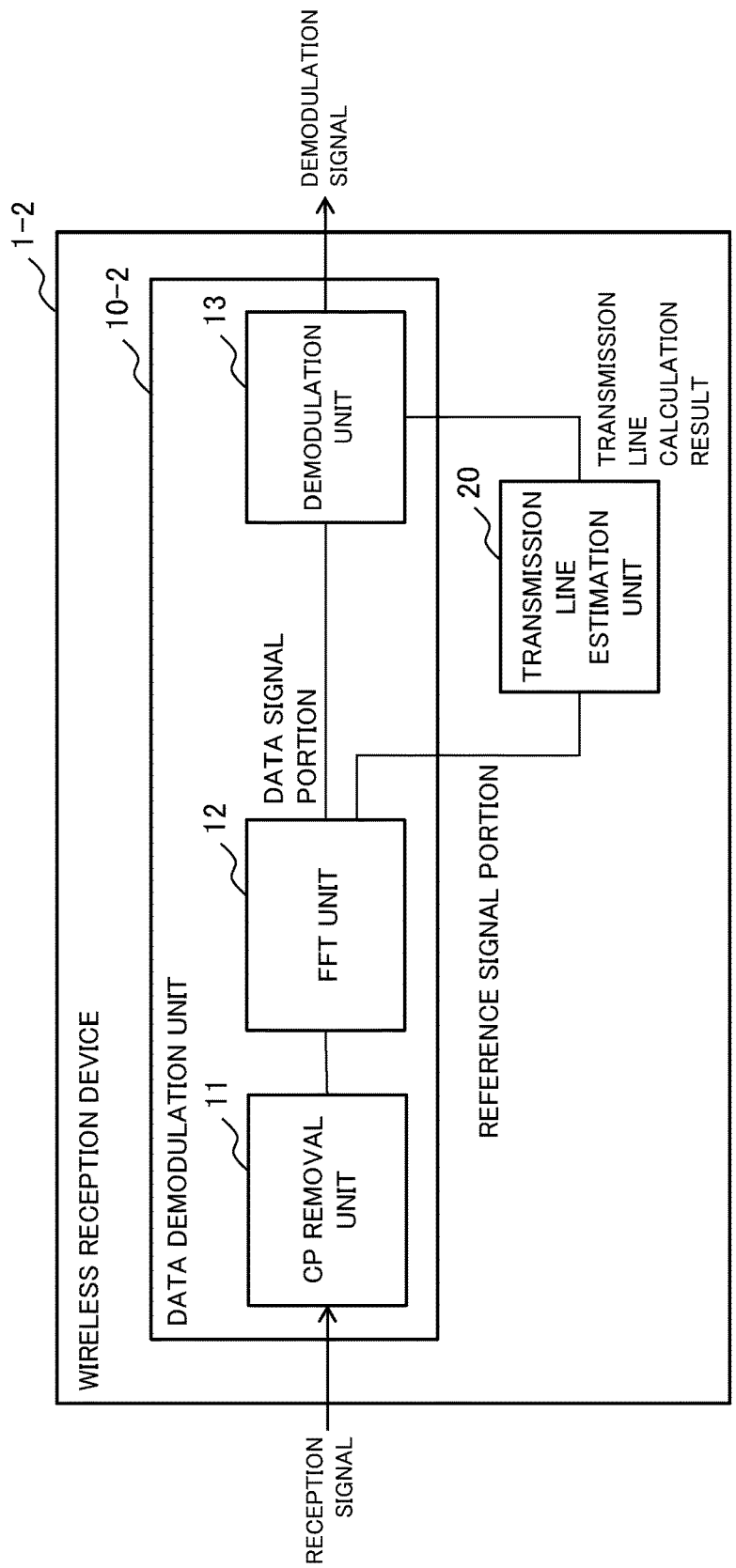
FIG. 5 is a block diagram illustrating an example of a configuration of a data demodulation unit of the wireless reception device according to the first example embodiment of the present invention.

Here, an example of a configuration of the data demodulation unit 10 will be explained with reference to drawings. FIG. 5 is a block diagram illustrating an example of a configuration of a wireless reception device 1-2 which carries out signal transmission based on the orthogonal frequency division multiplexing (hereinafter, denoted as OFDM). Here, FIG. 5 merely illustrates the example of the configuration of the data demodulation unit 10, and a configuration of the data demodulation unit 10 of the present example embodiment is not limited to the example of the configuration illustrated in FIG. 5.

As illustrated in FIG. 5, the wireless reception device 1-2 includes a data demodulation unit 10-2 and the transmission line estimation unit 20. The data demodulation unit 10-2 includes a CP removal unit 11 (CP: Cyclic Prefix), a FFT unit 12 (FFT: Fast Fourier Transform), and a demodulation unit 13. The CP removal unit 11 acquires the reception signal which is received by an antenna not illustrated in the drawing, and removes CP from the inputted reception signal. The CP removal unit 11 outputs input data, whose number agrees with number of FFT points, to the FFT unit 12.

The FFT unit 12 acquires the reception signal, from which CP is removed, from the CP removal unit 11. The FFT unit 12 converts the time-domain reception signal into a frequency-domain reception signal by carrying out a FFT process to the reception signal from which CP is removed. The FFT unit 12 divides the FFT calculation result on the input data, whose number agrees with the number of the FFT points, into the reference signal portion and the data signal portion. The FFT unit 12 outputs the data signal portion to the demodulation unit 13, and outputs the reference signal portion to the transmission line estimation unit 20.

The demodulation unit 13 acquires the data signal portion from the FFT unit 12, and acquires the transmission line calculation result from the transmission line estimation unit 20. The demodulation unit 13 demodulates the data signal portion by using the transmission calculation result, and regenerates the original signal. The demodulation unit 13 outputs the regenerated original signal. For example, when using SC-FDMA (Single Carrier Frequency Division Multiple Access), IDFT (Inverse Discrete Fourier Transform) is carried out after an equalization process which is carried out by the demodulation unit.

The transmission line estimation unit 20 inputs the reference signal portion out of the frequency domain signal which is outputted by the FFT unit 12. The transmission line estimation unit 20 calculates the delay profile from the transmission line estimation result which is estimated from the inputted reference signal portion. Then, the transmission line estimation unit 20 detects the path from the calculated delay profile, and calculates the transmission line per path on the basis of the delay profile per path. The transmission line estimation unit 20 outputs the transmission line calculation result, which is acquired by combining the transmission line calculation results per path, to the demodulation unit 13.

FIG. 5 illustrates an example of a configuration of the data demodulation unit 10-2 which carries out signal transmission based on OFDM. When a modulation unit not based on OFDM carries out signal transmission, the CP removal unit 11 and the FFT unit 12 are not indispensable components.

Above is explanation on the configuration of the wireless reception device 1 of the present example embodiment.

(Operation)

Next, an operation of the wireless reception device 1 of the present example embodiment will be explained with reference to drawings. Herein, a transmission line estimation process which is carried out by the transmission line estimation unit 20, and a transmission line calculation process which is carried out by the transmission line calculation unit 25 will be explained in the following as the operation of the wireless reception device.

[Transmission Line Estimation Process]

Figure 6:
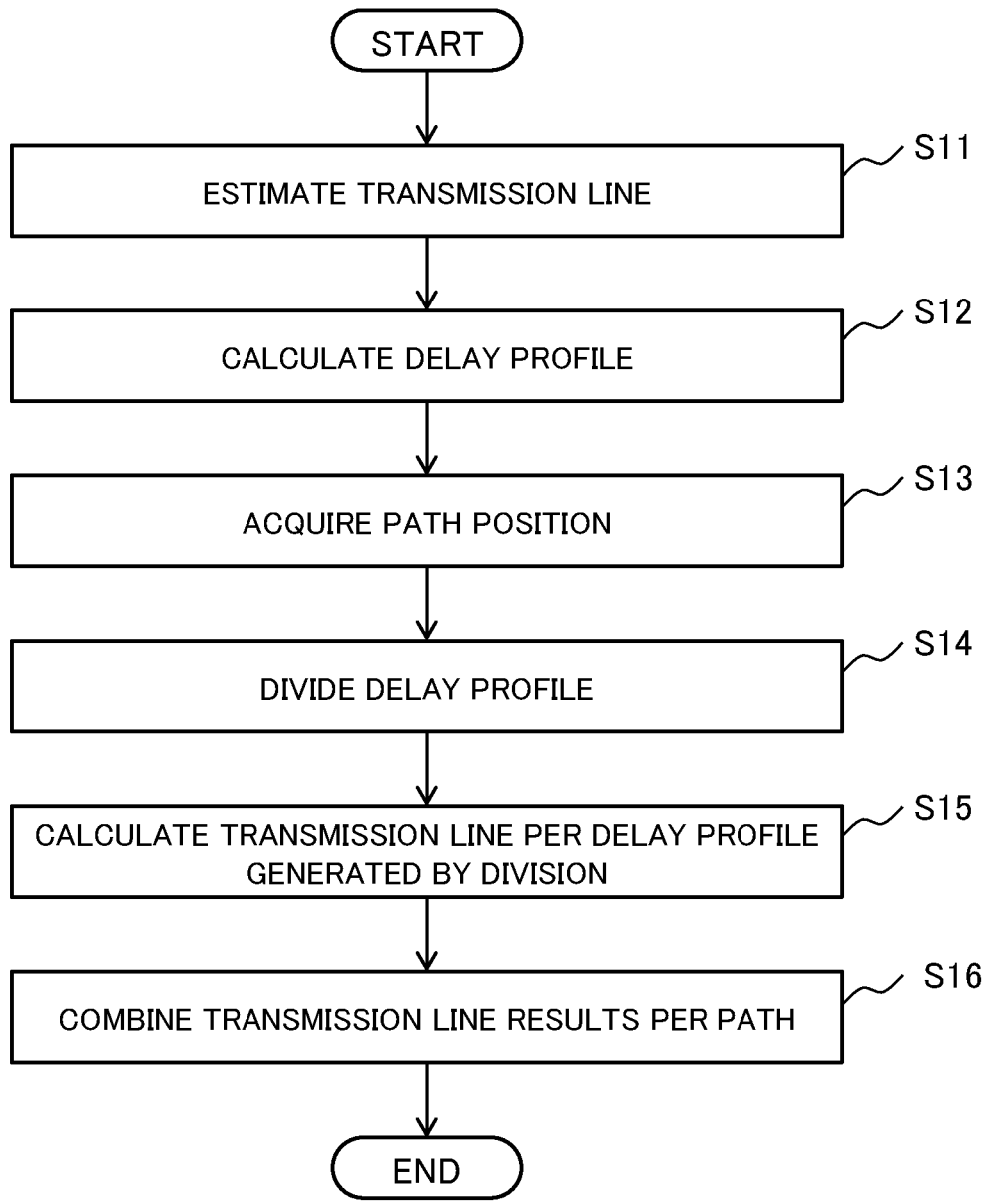
FIG. 6 is a flowchart illustrating a transmission line estimation process which is carried out by the wireless reception device according to the first example embodiment of the present invention.

Firstly, the transmission line estimation process which is carried out by the transmission line estimation unit 20 will be explained. FIG. 6 is a flowchart illustrating a flow of the transmission line estimation process which is carried out by the transmission line estimation unit 20.

In FIG. 6, firstly, the reference multiplication unit 21 calculates the transmission line estimation result by multiplying the reference signal portion of the reception signal by an inverse of the known reference signal replica (Step S11).

The IFFT unit 22 calculates the delay profile by carrying out Inverse Fourier Transform to the transmission line estimation result (Step S12).

The path detection unit 23 detects all points, which have amplitude values equal to or larger than a threshold value, from the delay profile, and outputs an index of the IFFT point as the path position (Step S13).

The delay profile division unit 24 divides the delay profile into pieces, whose number agrees with number of the paths, by using the path position which is outputted by the path detection unit 23 (Step S14).

The transmission line calculation unit 25 calculates the transmission line per the delay profile (Step S15).

The transmission line calculation unit 25 sums all of the transmission line calculation results per path, which are outputted from each delay profile, and outputs a summed result as the transmission line calculation result (Step S16).

Above is explanation on the flow of the transmission line estimation process which is carried out by the transmission line estimation unit 20.

Figure 7:
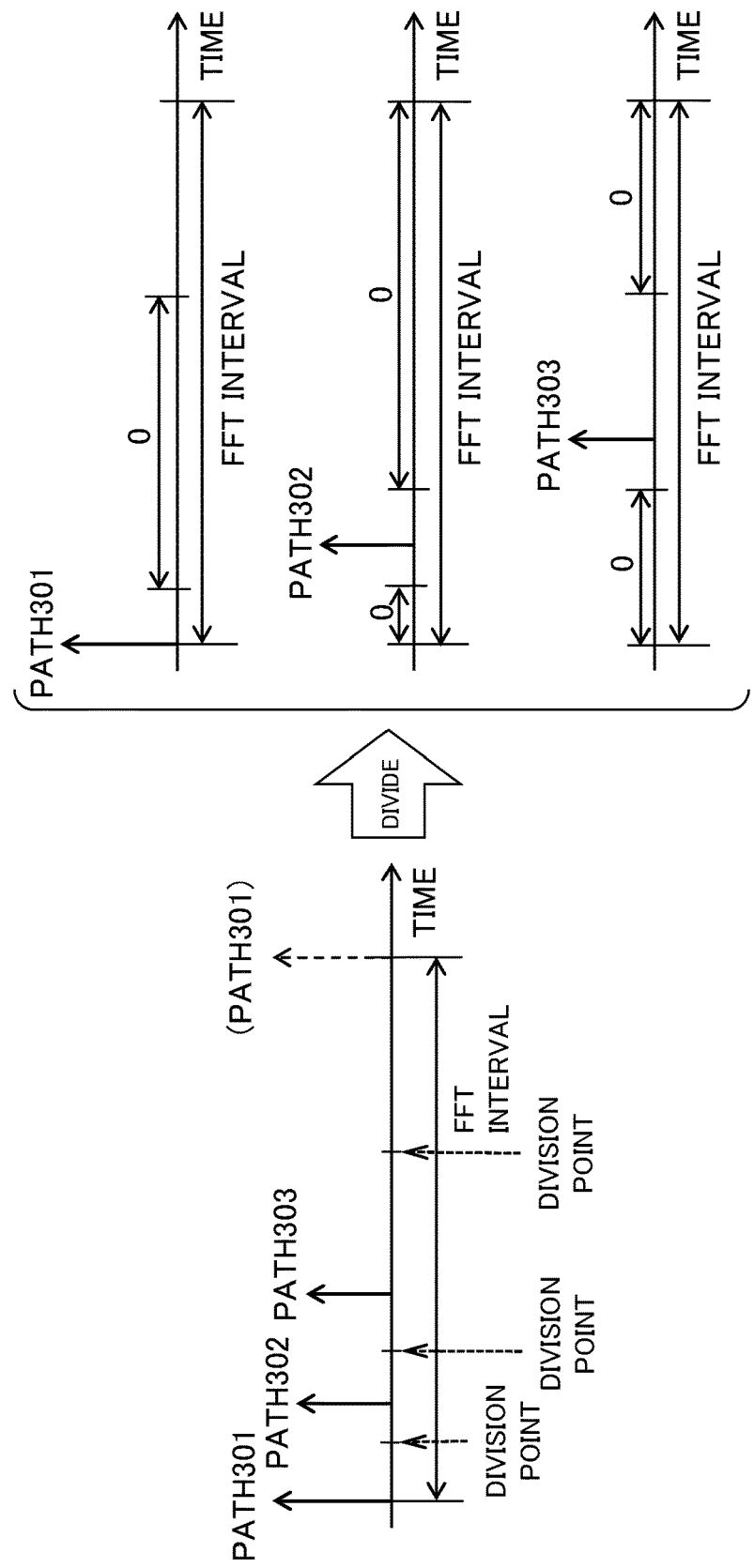
FIG. 7 is a conceptual diagram for explaining an example of an operation of a delay profile division unit of the transmission line estimation unit of the wireless reception device according to the first example embodiment of the present invention.

Here, division per the path, which is carried out by the delay profile division unit 24 will be explained with reference to drawings. FIG. 7 exemplifies division per the path which is carried out by the delay profile division unit 24. FIG. 7 exemplifies a case that number of the paths is three.

As illustrated in FIG. 7, the delay profile division unit 24 calculates division points which exist between a path 301 and a path 302, between the path 302 and a path 303, and between the path 303 and the path 301. In an example illustrated in FIG. 7, the delay profile division unit 24 divides the delay profile into three pieces by using three calculated division points. The delay profile division unit 24 calculates the division point between the paths, for example, by defining a point, which divides a distance between two paths on the basis of an interpolation ratio determined by amplitude values of the paths, as the division point. However, a method of calculating the division point between the paths is not limited to the method mentioned above.

Figure 8:
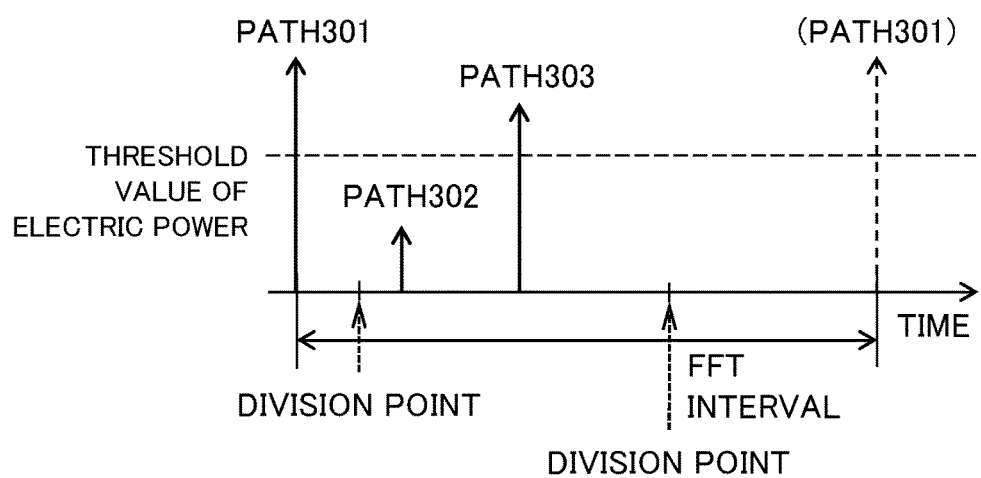
FIG. 8 is a conceptual diagram for explaining another example of the operation of the delay profile division unit of the transmission line estimation unit of the wireless reception device according to the first example embodiment of the present invention.

For example, the delay profile division unit 24 may set the division point between the paths, whose electric power values exceed a prescribed threshold value, as illustrated in FIG. 8. According to an example illustrated in FIG. 8, the delay profile division unit 24 divides the delay profile with respect to the path 301 and the path 303 whose electric power values exceed the threshold value, and does not divide the delay profile with respect to the path 302 whose electric power value does not exceed the threshold value.

[Transmission Line Calculation Process]

Figure 9:
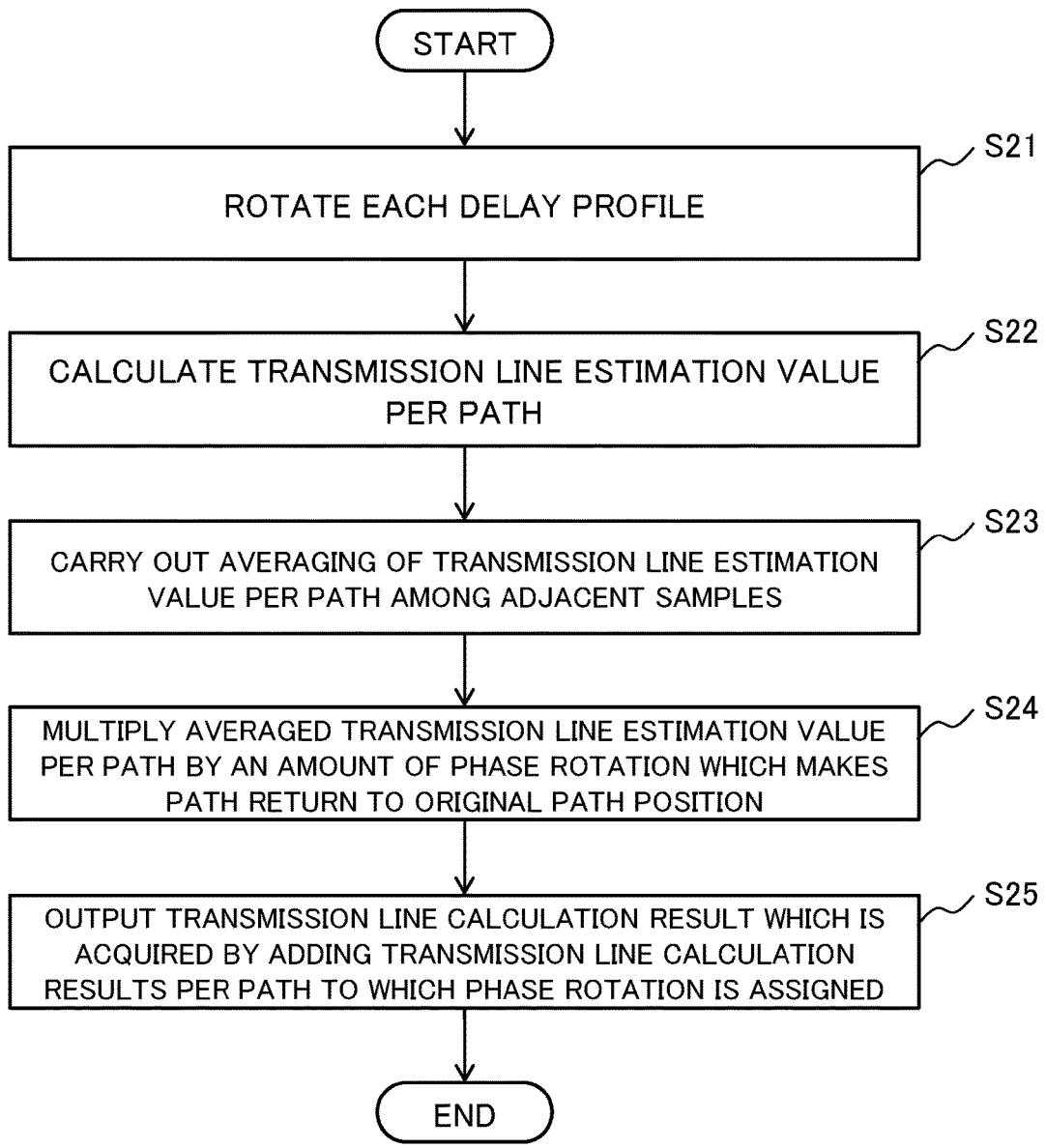
FIG. 9 is a flowchart illustrating a transmission line calculation process which is carried out by the wireless reception device according to the first example embodiment of the present invention.

Next, the transmission line calculation process which is carried out by the transmission line calculation unit 25 will be explained. FIG. 9 is a flowchart illustrating a flow of the transmission line calculation process which is carried out by the transmission line calculation unit 25.

In FIG. 9, firstly, the delay profile rotation unit 51 rotates each delay profile according to a value of the inputted path position (Step S21). Specifically, the delay profile rotation unit 51 rotates the delay profile in such a way that the path position of each delay profile becomes a head of a FFT interval.

The FFT unit 52 carries out FFT to each delay profile to which rotation is carried out, and outputs the transmission line estimation value per path (Step S22).

The averaging processing unit 53 carries out averaging to the transmission line estimation value per path among the adjacent samples, and consequently suppresses the noise (Step S23).

The phase multiplication unit 54 multiplies the averaged transmission line estimation value per path by an amount of the phase rotation which is determined by the path position inputted from the path detection unit 23 (Step S24). By carrying out the process of Step S24, movement of the path position, which is added by the delay profile rotation unit 51, is canceled, and the transmission line calculation result per path related to the original path position is acquired.

The combination unit 55 sums the inputted transmission line calculation results per path whose number agrees with number of the paths, and outputs the summed result as the transmission line calculation result (Step S25).

Above is explanation on the flow of the transmission line calculation process which is carried out by the transmission line calculation unit 25.

Figure 10:
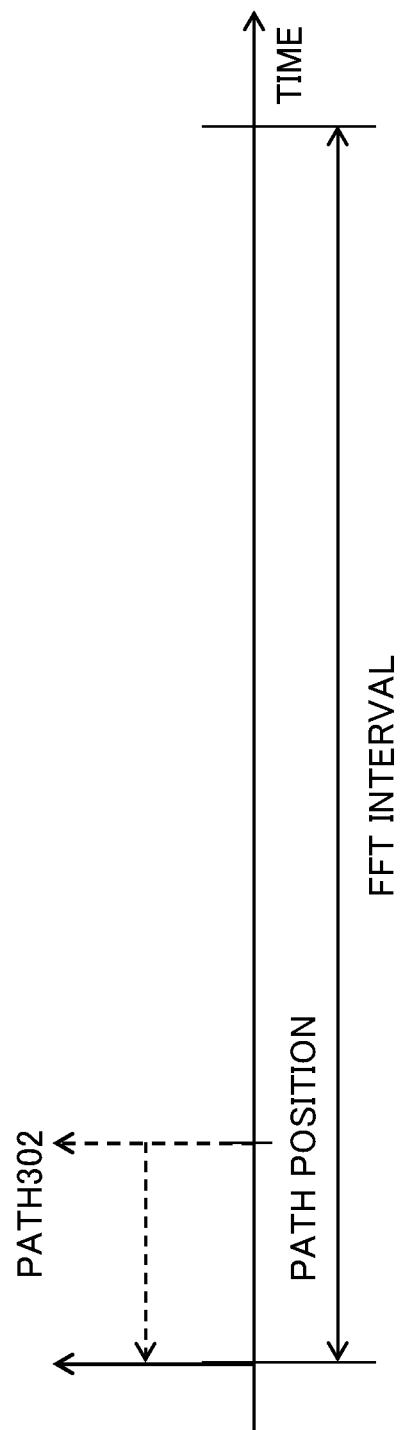
FIG. 10 is a conceptual diagram for explaining an operation of a delay profile rotation unit of the transmission line calculation unit of the wireless reception device according to the first example embodiment of the present invention.

Here, rotation of each delay profile, which is carried out by the delay profile rotation unit 51 and which is determined by the value of the path position, will be explained with reference to drawings. FIG. 10 relates to an example of an operation which is carried out by the delay profile rotation unit 51 to the delay profile which is generated by division related to the path 302 illustrated in FIG. 7.

As illustrated in FIG. 10, the delay profile rotation unit 51 rotates the delay profile (dotted line) to a position indicated by a left side solid line in such a way that the path position of the path 302 may move to a head of the FFT interval. As a result of the path position of the path 302 moving to the head of the FFT interval, the phase rotation is removed from the transmission line estimation value per path which is a result of Fourier Transform carried out to the rotated delay profile. Consequently, it is possible to secure in-phase characteristics of the transmission line estimation value per path among the samples.

As mentioned above, according to the present example embodiment, it is possible to suppress the noise without suppressing the delay path which is generally suppressed together with the noise when carrying out averaging in the frequency domain in estimation of the transmission line. Therefore, according to the technique of the present example embodiment, it is possible to improve accuracy in estimating the transmission line under the multi-path environment in comparison with the general averaging method in the frequency domain. That is, according to the present example embodiment, it is possible to carry out noise suppression without suppressing the electric power of the reception signal, which loses the in-phase characteristics due to the multi-path having the long delay time, by carrying out averaging in the frequency domain.

Moreover, according to the present example embodiment, since typical paths are selected, and the delay profile is selected and divided per the path, the delay profiles which are generated by division have prescribed amplitude values respectively in the frequency domain. As a result, according to the present example embodiment, it is possible to improve accuracy in estimating the transmission line in comparison with a case of carrying out averaging under the multi-path environment as it is, that is, a case of carrying out averaging to objects having characteristics different each other.

Moreover, according to the present example embodiment, by carrying out FFT in a state that the delay profile generated by division is rotated, it is possible to suppress that the electric power of the signal decreases together with the noise. Furthermore, according to the present example embodiment, it is possible to suppress the noise with maintaining the side robe of the path since the path does not exist at the edge of the pass-band of the filter.

That is, according to the present example embodiment, it is possible to suppress the noise with maintaining the side robe, and to improve accuracy in estimating the transmission line including the delay path having the long delay time.

(Second Example Embodiment)

Next, a wireless reception device according to a second example embodiment of the present invention will be explained with reference to drawings. The present example embodiment is different from the first example embodiment in a point that a weight value for carrying out averaging is calculated from the delay profile, and averaging is carried out after assigning the weight value to the transmission line estimation result. Here, since the wireless reception device of the present example embodiment is the same as the wireless reception device 1 (FIG. 1) of the first example embodiment except for a transmission line estimation unit, detailed explanation is omitted.

Figure 11:
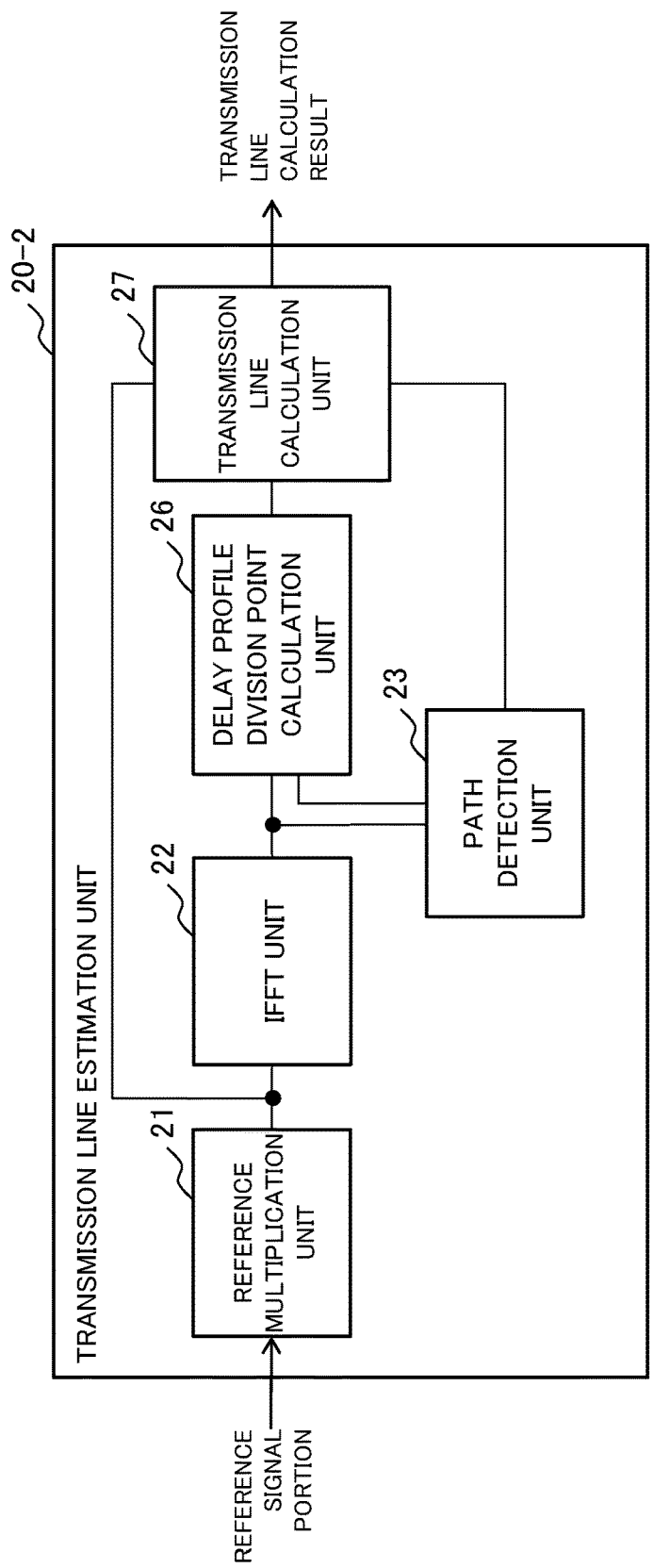
FIG. 11 is a block diagram illustrating a configuration of a transmission line estimation unit of a wireless reception device according to a second example embodiment of the present invention.

FIG. 11 is a block diagram illustrating a configuration of a transmission line estimation unit 20-2 of the present example embodiment. As illustrated in FIG. 11, the transmission line estimation unit 20-2 includes the reference multiplication unit 21, the IFFT unit 22, the path detection unit 23, a delay profile division point calculation unit 26, and a transmission line calculation unit 27.

The transmission line estimation unit 20-2 is different from the transmission line estimation unit 20 of the first example embodiment in a point that the delay profile division unit 24 and the transmission line calculation unit 25 of the first example embodiment are replaced with the delay profile division point calculation unit 26 and the transmission line calculation unit 27 respectively. Moreover, the transmission line estimation unit 20-2 is different from the transmission line estimation unit 20 of the first example embodiment in a point that the reference multiplication unit 21 outputs the transmission line estimation result to the transmission line calculation unit 27. Explanation on a configuration, which is the same as the transmission line estimation unit 20 of the first example embodiment, is omitted.

The delay profile division point calculation unit 26 as well as the delay profile division unit 24 inputs the delay profile and the path position, and calculates the division point of the delay profile. Moreover, the delay profile division point calculation unit 26 outputs an index of the calculated division point to the transmission line calculation unit 27.

The transmission line calculation unit 27 inputs the transmission line estimation result from the reference multiplication unit 21, the path position from the path detection unit 23, and the index of the delay profile division point from the delay profile division point calculation unit 26. The transmission line calculation unit 27 calculates a transmission line by using the transmission line estimation result, the path position, and the index of the delay profile division point. The transmission line calculation unit 27 outputs a calculated transmission line calculation result.

Figure 12:
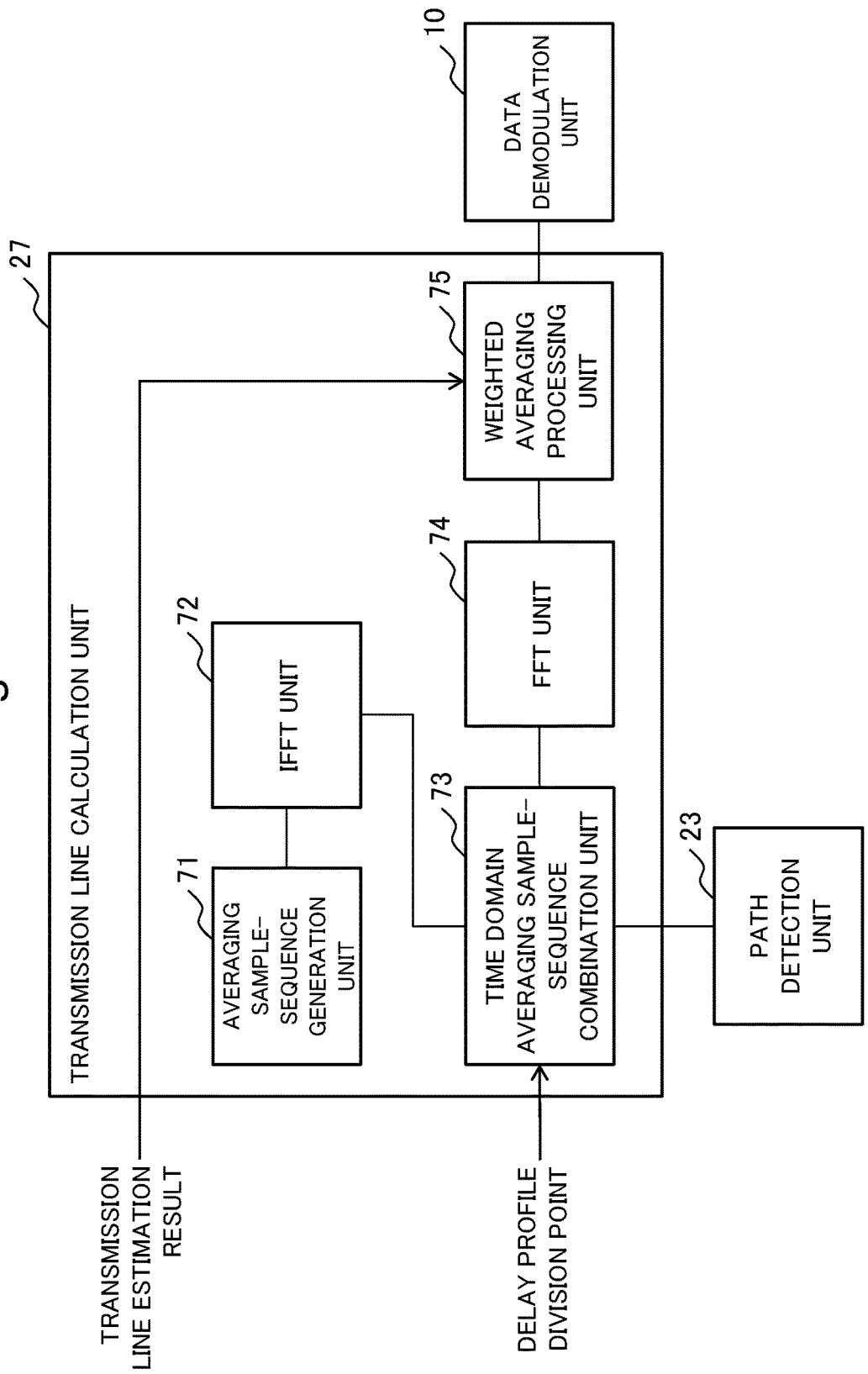
FIG. 12 is a block diagram illustrating a configuration of a transmission line calculation unit of the transmission line estimation unit of the wireless reception device according to the second example embodiment of the present invention.

FIG. 12 is a block diagram illustrating a configuration of the transmission line calculation unit 27. As illustrated in FIG. 12, the transmission line calculation unit 27 includes an averaging sample-sequence generation unit 71, an IFFT unit 72, a time domain averaging sample-sequence combination unit 73, a FFT unit 74, and a weighted averaging processing unit 75.

The averaging sample-sequence generation unit 71 outputs a sample sequence including samples whose number is the same as number of samples of the delay profile outputted by the IFFT unit 22. The averaging sample-sequence generation unit 71 outputs a sample sequence which has numerical values of 1, whose number agrees with number of averaging samples indicating number of the adjacent samples among which the weighted averaging processing unit 75 carries out averaging, at a head part thereof and which has numerical values of 0 at a part other than the head part as the sample value thereof.

The IFFT unit 72 (also referred to as a time domain averaging sample-sequence generation unit) carries out Inverse Fourier Transform to the sample sequence inputted from the averaging sample-sequence generation unit 71. The IFFT unit 72 outputs a time domain averaging sample-sequence, which becomes the sinc function by carrying out the Inverse Fourier Transform process, to the time domain averaging sample-sequence combination unit 73.

The time domain averaging sample-sequence combination unit 73 inputs the time domain averaging sample-sequence which is outputted by the IFFT unit 72, inputs the delay profile division point which is outputted by the delay profile division point calculation unit 26, and inputs the path position which is outputted by the path detection unit 23. The time domain averaging sample-sequence combination unit 73 calculates a time domain weight sequence by using the inputted values mentioned above. The time domain averaging sample-sequence combination unit 73 outputs the calculated time domain weight sequence (also referred to as a combined time domain averaging sample sequence).

As a first process, the time domain averaging sample-sequence combination unit 73 makes the time domain averaging sample sequence rotated in a right side direction by a length, which is corresponding to a value of the index of the path position, for each path.

As a second process, the time domain averaging sample-sequence combination unit 73 carries out a process, which is the same as the process carried out by the delay profile division unit 24, to the time domain averaging sample sequence which is rotated, and replaces a value of the sample, which exists outside a division area including the path, with 0.

The time domain averaging sample-sequence combination unit 73 carries out the first process and the second process to each path, and calculates the combined time domain averaging sample sequence by adding the acquired time domain averaging sample sequences. The time domain averaging sample-sequence combination unit 73 outputs the combined time domain averaging sample sequence, which is calculated, to the FFT unit 74.

The FFT unit 74 (also referred to as an averaging weight-coefficient calculation unit) inputs the combined time domain averaging sample sequence which is outputted by the time domain averaging sample-sequence combination unit 73. The FFT unit 74 carries out the FFT calculation to the combined time domain averaging sample sequence. The FFT unit 74 calculates an averaging weight coefficient by extracting the samples, which exist at a top part of the FFT calculation result and whose number agrees with number of the averaging samples, and reversing an order of the extracted samples. The FFT unit 74 outputs the calculated averaging weight coefficient to the weighted averaging processing unit 75.

The weighted averaging processing unit 75 inputs the averaging weight coefficient which is outputted by the FFT unit 74. The weighted averaging processing unit 75 calculates the transmission line by assigning the averaging weight coefficients, which are outputted by the FFT unit 74, to the samples whose number agrees with number of the averaging samples, and carrying out averaging among the adjacent samples which are assigned the weight coefficients. The weighted averaging processing unit 75 outputs the transmission line calculation result to the data demodulation unit 10.

As mentioned above, the wireless reception device of the present example embodiment calculates the weight coefficient, which is used for carrying out averaging, from the delay profile, and assigns the weight coefficient to the transmission line estimation result, and carries out averaging to the weighted transmission line estimation result. Therefore, according to the present example embodiment, it is possible to simplify the averaging process in comparison with the first example embodiment.

(Third Example Embodiment)

Next, a wireless reception device according to a third example embodiment of the present invention will be explained with reference to drawings. The present example embodiment is based on a concept superordinate to the first and the second example embodiments. Here, since the wireless reception device of the present example embodiment is the same as the wireless reception device of the first example embodiment except for a transmission line estimation unit, detailed explanation is omitted.

Figure 13:
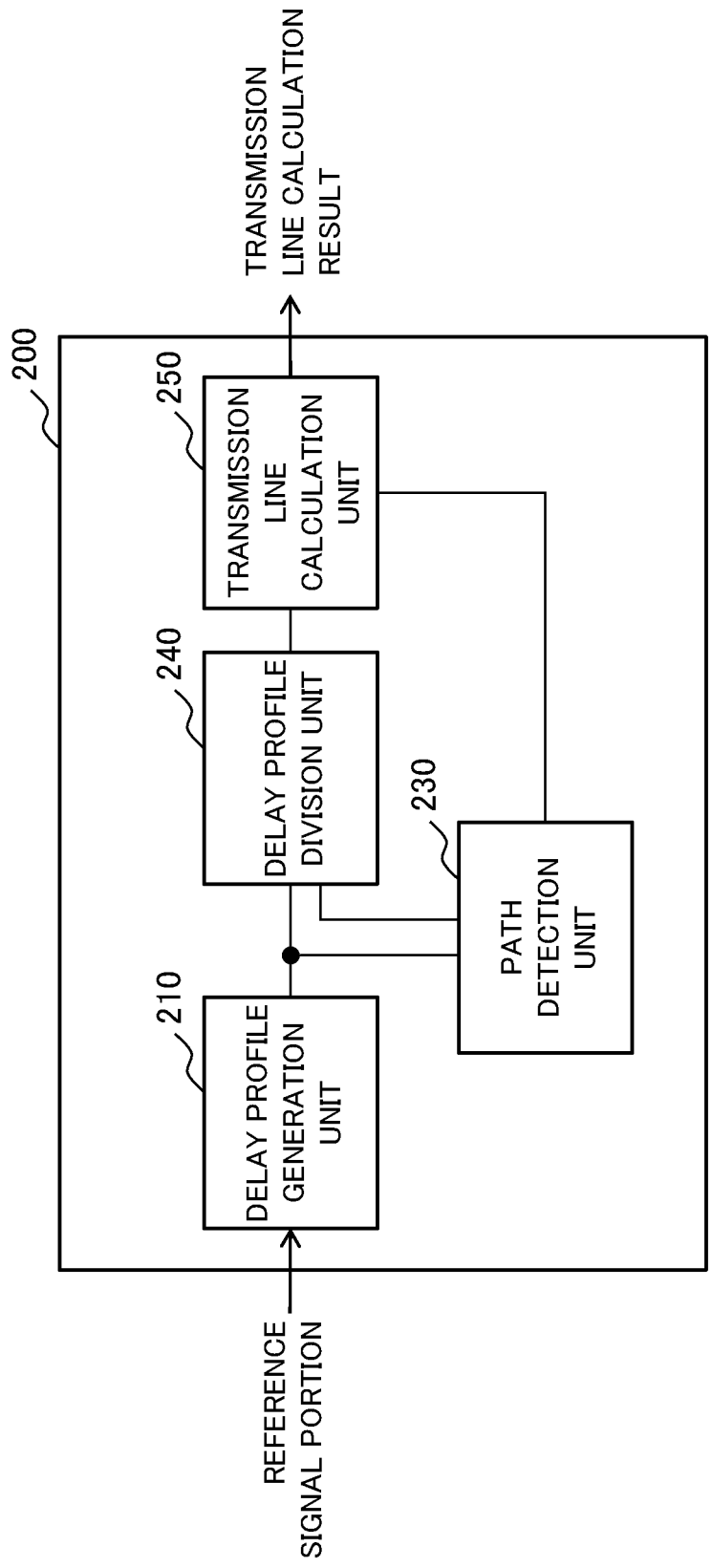
FIG. 13 is a block diagram illustrating a configuration of a transmission line calculation unit of a transmission line estimation unit of a wireless reception device according to a third example embodiment of the present invention.

FIG. 13 is a block diagram illustrating a configuration of a transmission line estimation unit 200 of the wireless reception device of the present example embodiment. The transmission line estimation unit 200 includes a delay profile generation unit 210, a path detection unit 230, a delay profile division unit 240, and a transmission line calculation unit 250.

The delay profile generation unit 210 inputs a reference signal portion included in a reception signal which is converted into a frequency domain signal.

The delay profile generation unit 210 estimates a transmission line from the inputted reference signal portion by using a known reference signal replica, and calculates a delay profile from a transmission line estimation result. The delay profile generation unit 210 outputs the calculated delay profile to the path detection unit 230 and the delay profile division unit 240.

The path detection unit 230 inputs the delay profile which is outputted by the delay profile generation unit 210. The path detection unit 230 outputs a position of a sample, which is included in the inputted delay profile, to the delay profile division unit 240 as a path position. For example, the path detection unit 230 outputs the position of the sample, whose electric power exceeds a threshold value, out of the inputted delay profile as the path position.

The delay profile division unit 240 inputs the delay profile and the path position from the delay profile generation unit 210 and the path detection unit 230 respectively. The delay profile division unit 240 divides the inputted delay profile into pieces whose number agrees with number of paths. The delay profile division unit 240 outputs delay profiles, which is generated by division, to the transmission line calculation unit 250.

The transmission line calculation unit 250 inputs the delay profiles which are generated by division from the delay profile division unit 240, and inputs the path position from the path detection unit 230. The transmission line calculation unit 250 suppresses electric power of noise by removing phase rotation from a delay profile per path, and carrying out an averaging process in the frequency domain to the delay profile per path from which the phase rotation is removed. After carrying out the averaging process in the frequency domain, the transmission line calculation unit 250 calculates the transmission line by multiplying a transmission line estimation value per path, which is an averaged transmission line calculation result per path, by the phase rotation which has been removed before the averaging process, and combining the transmission line calculation results per path on which the noise is suppressed. The transmission line calculation unit 250 outputs a result, which is acquired by summing all of the transmission line calculation results per path whose number agrees with number of the paths, as a transmission line estimation result.

(Process System)

Figure 14:
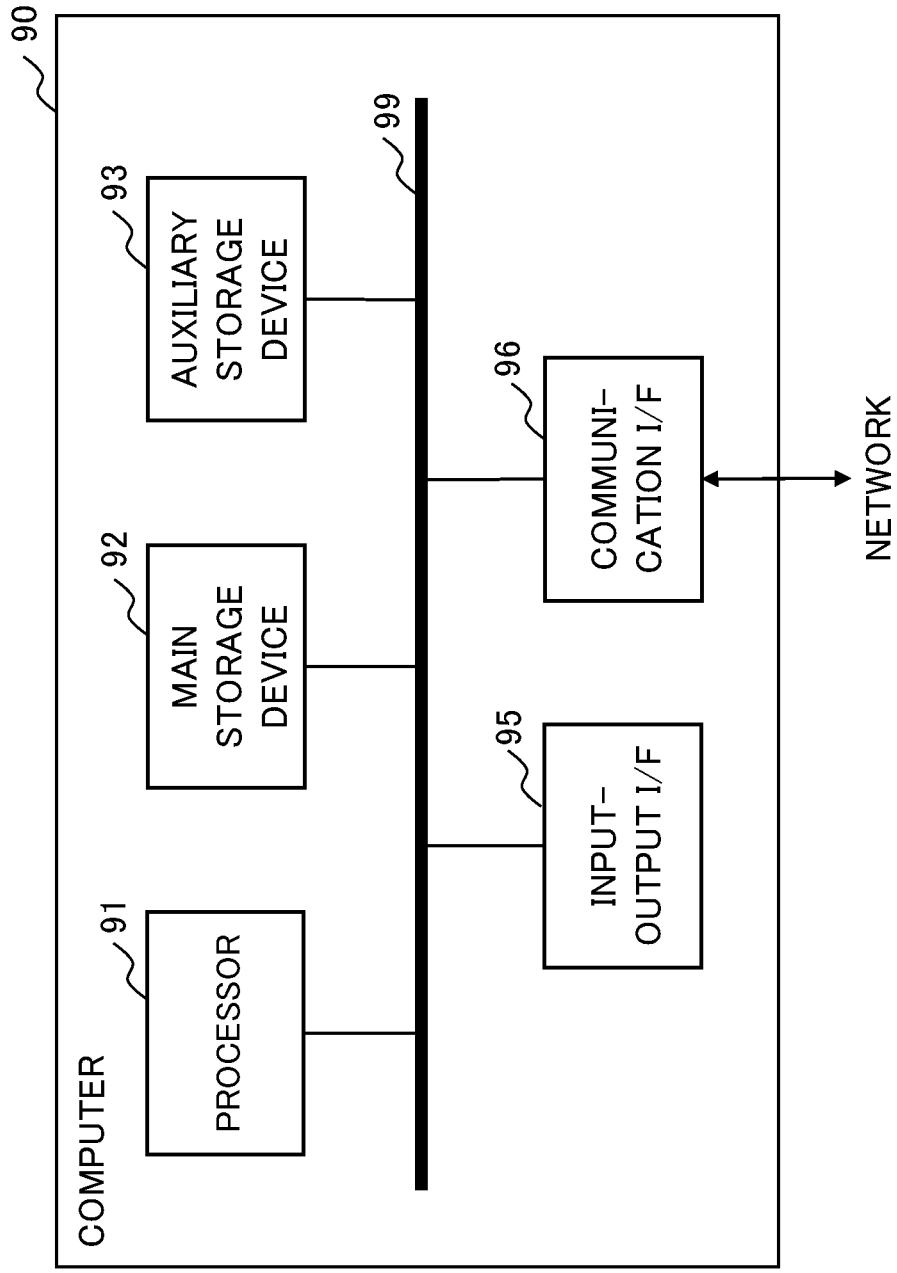
FIG. 14 is a block diagram illustrating an example of a hardware configuration of a control system of the wireless reception device according to each example embodiment of the present invention.

Here, a hardware configuration, which enables a process system carrying out an operation process and a control process of the wireless reception device according to the present example embodiment, will be explained by exemplifying a computer 90 illustrated in FIG. 14. Here, the computer 90 illustrated in FIG. 14 is exemplified as a configuration example for enabling the process system of the wireless reception device of each example embodiment, and the configuration example does not limit the scope of the present invention. Moreover, the process system of the wireless reception device according to the present example embodiment may not include all of the components illustrated in FIG. 14, or may include a component not illustrated in FIG. 14.

As illustrated in FIG. 14, the computer 90 includes a processor 91, a main storage device 92, an auxiliary storage device 93, an input-output interface 95, and a communication interface 96. In FIG. 14, 'interface' is abbreviated as 'I/F'. The processor 91, the main storage device 92, the auxiliary storage device 93, the input-output interface 95, and the communication interface 96 are data-communicably connected each other through a bus 99. Moreover, the processor 91, the main storage device 92, the auxiliary storage device 93, and the input-output interface 95 are connected with a network such as Internet, Intranet or the like through the communication interface 96.

The processor 91 expands a program, which is stored by the auxiliary storage device 93 or the like, in the main storage device 92, and executes the expanded program. It is preferable to suppose that each example embodiment adopts a configuration that a software program installed in the computer 90 is used. The processor 91, which is the example of the process system of the wireless reception device according to the present example embodiment, carries out the operation process and the control process.

The main storage device 92 has an area where the program is expanded. The main storage device 92 can be achieved, for example, by a transitory memory such as Dynamic Random Access Memory (DRAM) or the like, or by a non-transitory memory such as Magnetoresistive Random Access Memory (MRAM) or the like.

The auxiliary storage device 93 stores various kinds of data. The auxiliary storage device 93 includes a local disk such as a hard disk, a flash memory, or the like. Here, a configuration that the main storage device 92 stores the various kinds of data, and the auxiliary storage device 93 is not used may be applied.

The input-output interface 95 connects the computer 90 and a peripheral device on the basis of a standard on connection between the computer 90 and the peripheral device. The communication interface 96 connects with a network such as Internet, Intranet, or the like on the basis of a standard and a specification. The input-output interface 95 and the communication interface 96 may be united as an interface for connection with external equipment.

A configuration that input equipment such as a keyboard, a mouse, a touch panel, or the like connects with the computer 90 may be used as needed. The above-mentioned input equipment is used for inputting information or setting information. When the touch panel is used as the input equipment, it is preferable to suppose that a display screen of display equipment is a component also working as an interface of the input equipment. The input-output interface 95 mediates data communication between the processor 91 and the input equipment. Moreover, display equipment for displaying image information may be attached to the computer 90. The display equipment connects with the computer 90 through the input-output interface 95.

The communication interface 96 connects with an external system or external equipment through a network. A configuration that the communication interface 96 has a function of wireless communication, and sends and receives various kinds of data by the function of wireless communication.

Moreover, a reader-writer may be attached to the computer 90 as needed. The reader-writer connects with the bus 99. The reader-writer mediates between the processor 91 and a recording medium (program recording medium) not illustrated in the drawing, that is, mediates reading of a program and data from the recording medium, and writing a process result of the computer 90 into the recording medium, etc. The recording medium can be achieved by a semiconductor recording medium or the like such as, for example, a Universal Serial Bus (USB) memory, a Secure Digital (SD) card, or the like. Moreover, the recording medium can be also achieved by a magnetic recording medium such as a flexible disk, or the like, an optical recording medium such as Compact Disc (CD), Digital Versatile Disc (DVD), or the like, or another recording medium.

Above is the example of the hardware configuration to enable the process system of the wireless reception device according to each example embodiment of the present invention. Here, the computer 90 illustrated in FIG. 14 is an example of the hardware configuration to enable the process system of the wireless reception device according to each example embodiment of the present invention, and the example of the hardware configuration does not limit the scope of the present invention.

At least, any one of the components included in the process system of the wireless reception device according to each example embodiment of the present invention is achieved by the computer 90 illustrated in FIG. 14. For example, the component included in the process system of the wireless reception device according to each example embodiment of the present invention can be realized by software working on the computer 90 illustrated in FIG. 14. Moreover, the component included in the process system of the wireless reception device according to each example embodiment of the present invention may be achieved by a circuit which has the function of each component.

Moreover, a program which makes a computer execute the process related to the wireless reception device according to each example embodiment of the present invention is also within the scope of the present invention. Furthermore, a program recording medium which records the program according to each example embodiment of the present invention is also within the scope of the present invention.

(Related Art)

Next, a wireless reception device of a related art, which calculates a transmission line by using an averaging method in the frequency domain, will be explained with reference to drawings. Here, since the wireless reception device of the related art is the same as the wireless reception device 1 of the first example embodiment except for a transmission line estimation unit, detailed explanation is omitted. A configuration example that the transmission line estimation unit illustrated in FIG. 15 is used in place of the transmission line estimation unit 20 illustrated in FIG. 1 will be explained in the following.

FIG. 15 is a block diagram illustrating a configuration of a transmission line estimation unit 420 of the wireless reception device of the related art. The transmission line estimation unit 420 includes a reference multiplication unit 421 and an averaging processing unit 423. The transmission line estimation unit 420 puts an inputted reference signal portion into the reference multiplication unit 421.

The reference multiplication unit 421 estimates a transmission line from the reference signal portion by using a known reference signal replica. The reference multiplication unit 421 puts a transmission line estimation result into the averaging processing unit 423.

The averaging processing unit 423 carries out averaging to the inputted transmission estimation result per adjacent samples whose number is preset, and outputs an averaging result as a transmission line calculation result. The transmission line estimation unit 420 outputs the transmission line calculation result which is calculated by the averaging processing unit 423.

According to the wireless reception device of the related art, when a phase fluctuation occurs among samples, which exist within an averaging range, due to influence of a multi-path having a long delay time, averaging among the samples which lose in-phase characteristics each other is carried out. Therefore, the wireless reception device of the related art has a problem that an amplitude of the sample becomes small after carrying out averaging, and consequently accuracy in estimating the transmission line become degraded.

In contrast, according to the wireless reception device of each example embodiment of the present invention, it is possible to suppress the noise without suppressing the electric power of the reception signal, which loses the in-phase characteristics due to the multi-path having the long delay time, by carrying out averaging in the frequency domain.

The previous description of embodiments is provided to enable a person skilled in the art to make and use the present invention. Moreover, various modifications to these example embodiments will be readily apparent to those skilled in the art, and the generic principles and specific examples defined herein may be applied to other embodiments without the use of inventive faculty. Therefore, the present invention is not intended to be limited to the example embodiments described herein but is to be accorded the widest scope as defined by the limitations of the claims and equivalents.

Further, it is noted that the inventor's intent is to retain all equivalents of the claimed invention even if the claims are amended during prosecution.

An example advantage according to the present invention is to provide a wireless reception device which suppresses the noise with maintaining the side robe, and can improve accuracy in estimating the transmission line which includes the path having the long delay time.

The invention claimed is:

1. A wireless reception device, comprising:
transmission line estimation circuitry including:
delay profile generation configured to input a reference signal portion which is included in a reception signal converted into a frequency domain signal, and calculate a delay profile from a transmission line estimation result which is estimated based on the reference signal portion by using a known reference signal replica;
path detection circuitry configured to input the delay profile from the delay profile generation circuitry, and detect a position of a sample, which is included in the delay profile, as a path position;
delay profile division circuitry configured to input the delay profile from the delay profile generation circuitry, input the path position from the path detection circuitry, and divide the delay profile per a path based on the path position; and
transmission line calculation circuitry configured to input the delay profiles per path into which the delay profile is divided by the delay profile division circuitry, calculate a transmission line per path by carrying out averaging to the delay profile per path in the frequency domain, and combine transmission line calculation results per path.

2. The wireless reception device according to claim 1, wherein
the transmission line calculation circuitry is further configured to process each of the delay profiles per path.

3. The wireless reception device according to claim 1, wherein
the transmission line calculation circuitry is further configured to process each of the delay profiles per path in parallel.

4. The wireless reception device according to claim 1, wherein
the delay profile division circuitry is further configured to divide the delay profile per a path whose electric power exceeds a prescribed threshold value.

5. The wireless reception device according to claim 1, wherein
the delay profile generation circuitry includes:
reference multiplication circuitry configured to input the reference signal portion, and calculate the transmission line estimation result based on the reference signal portion by using the known reference signal replica; and
delay profile calculation circuitry configured to calculate the delay profile based on the transmission line estimation result outputted by the reference multiplication circuitry.

6. The wireless reception device according to claim 1, comprising:
delay profile rotation circuitry configured to input the delay profile per path from the delay profile division circuitry, and remove phase rotation by rotating the delay profile based on the path position in such a way that path timing of the delay profile per path become zero timing;
Fourier Transform circuitry configured to input the delay profile per path from which the phase rotation is removed by the delay profile rotation circuitry, and carry out Fourier Transform to the delay profile per path from which the phase rotation is removed;
averaging processing circuitry configured to input an output signal of the Fourier Transform circuitry, and carry out a frequency domain averaging process to the output signal of the Fourier Transform circuitry;

phase multiplication circuitry configured to input an output signal of the averaging processing circuitry, input the path position from the path detection circuitry, and calculate the transmission line calculation result per path by multiplying the output signal of the averaging processing circuitry by a phase which cancels the rotation carried out by the delay profile rotation circuitry based on the path position; and combination circuitry configured to input the transmission line calculation result per path from the phase multiplication circuitry, and combine all of the transmission line calculation results per path.

7. The wireless reception device according to claim 5, wherein the delay profile division circuitry is further configured to input the delay profile from the delay profile calculation circuitry, input the path position from the path detection circuitry, calculate a division point of the delay profile based on the path position, and output an index of the calculated division point to the transmission line calculation circuitry, and wherein the transmission line calculation circuitry is further configured to input the transmission line estimation result from the reference multiplication circuitry, input the path position from the path detection circuitry, input the index of the division point from the delay profile division circuitry, and calculate a transmission line based on the inputs.

8. The wireless reception device according to claim 7, wherein the transmission line calculation circuitry includes:

averaging sample-sequence generation circuitry configured to output a sample sequence including samples whose number agrees with number of samples of the delay profile outputted by the delay profile calculation circuitry;

time domain averaging sample-sequence generation circuitry configured to input the sample sequence outputted by the averaging sample-sequence generation circuitry, and generate a time domain averaging sample sequence by carrying out an Inverse Fourier Transform process to the inputted sample sequence;

time domain averaging sample-sequence combination circuitry configured to input the time domain averaging sample sequence from the time domain averaging sample-sequence generation circuitry, input the division point from the delay profile division circuitry, input the path position from the path detection circuitry, and calculate a combined time domain averaging sample sequence by using the inputted values;

averaging weight-coefficient calculation circuitry configured to input the combined time domain averaging sample sequence from the time domain averaging sample-sequence combination circuitry, and calculate an averaging weight coefficient by using the combined time domain averaging sample sequence which is inputted; and weighted averaging processing circuitry configured to input the transmission line estimation result from the reference multiplication circuitry, input the averaging weight coefficient from the averaging weight-coefficient calculation circuitry, assign the inputted weight coefficients to the samples whose number agrees with number of averaging samples, and calculate the transmission line calculation result by carrying out averaging among the weighted samples which are adjacent each other.

9. The wireless reception device according to claim 1, comprising:

data demodulation circuitry configured to receive the reception signal, convert the reception signal of a time domain signal into a frequency domain signal, and output the reference signal portion, which is included in the reception signal converted into the frequency domain signal, to the transmission line estimation circuitry, input the transmission line calculation result from the transmission line estimation circuitry, and regenerate an original signal from a data signal portion, which is included in the reception signal converted into the frequency domain signal, by using the inputted transmission line calculation result.

10. A wireless reception method, comprising:

inputting a reference signal portion, which is included in a reception signal converted into a frequency domain signal;

calculating a delay profile from a transmission line estimation result which is estimated based on the reference signal portion by using a known reference signal replica;

detecting a position of a sample, which is included in the delay profile, as a path position;

dividing the delay profile per a path based on the path position;

calculating a transmission line per path by carrying out averaging to the delay profile per path in the frequency domain;

combining transmission line calculation results per path; and performing demodulation by a demodulator on the combined results.

* * * * *